UNITED STATES PATENT OFFICE.

WILLIAM H. HIGGINS, OF CHICAGO, ILLINOIS.

YEAST.

SPECIFICATION forming part of Letters Patent No. 248,041, dated October 11, 1881.

Application filed February 4, 1881. (No specimens.)

*To all whom it may concern:*

Be it known that I, WM. H. HIGGINS, of Chicago, county of Cook, and State of Illinois, have invented certain Improvements in Yeast Compounds, of which the following is a specification.

The object of my invention is to produce a yeast compound which will resist the deteriorating effects of the atmosphere, and thus preserve its valuable properties for weeks and months, instead of losing them in a few hours or days, as the compounds heretofore known and used do. I accomplish this result by compressing, in any suitable manner, the froth or yeast which rises upon the surface of beer and other liquors during fermentation until the same is relieved of water and becomes partially dried, and then adding and mixing with it a sufficient quantity of glycerine in its fluid state to make a compound of the consistence of thick dough, or of putty when prepared for use in glazing; and then I add and work into it enough of corn starch or meal to make the whole thick enough to be conveniently formed into cakes or a coarse powder, and then it will be in a condition for preservation and use.

The theory of my invention is that the glycerine serves as a base in which the yeast becomes fixed, and is held practically impervious to water in the atmosphere, and the process of fermentation is suspended until such time as it may be desired to use the compound.

What I claim as my invention, and desire to secure by Letters Patent, is—

A yeast compound composed of the compressed foam from fermenting beer, liquid glycerine, and corn meal or starch, in the proportions described, substantially as described.

WM. H. HIGGINS.

Witnesses:
 A. M. STOUT,
 FREDERICK C. GOODWIN.